United States Patent
Kofman et al.

(10) Patent No.: US 7,969,281 B2
(45) Date of Patent: Jun. 28, 2011

(54) METHOD AND APPARATUS FOR IDENTIFICATION OF RADIO FREQUENCY TAG

(75) Inventors: Semion Kofman, Holon (IL); Yaron Meerfeld, Ramat Gan (IL); Maya Sandler, Bney-Aish (IL)

(73) Assignee: Inksure RF Inc., Fort Lauderdale, FL (US)

( * ) Notice: Subject to any disclaimer, the term of this patent is extended or adjusted under 35 U.S.C. 154(b) by 287 days.

(21) Appl. No.: 12/402,192

(22) Filed: Mar. 11, 2009

(65) Prior Publication Data

US 2009/0231104 A1     Sep. 17, 2009

Related U.S. Application Data

(63) Continuation of application No. PCT/IL2007/001119, filed on Sep. 11, 2007.

(60) Provisional application No. 60/844,382, filed on Sep. 14, 2006.

(51) Int. Cl.
    *G08B 13/14* (2006.01)

(52) U.S. Cl. .............. 340/10.1; 340/572.1; 340/572.2; 340/572.6

(58) Field of Classification Search .... 340/572.1–572.8, 340/5.86, 10.1; 235/487–495
    See application file for complete search history.

(56) References Cited

U.S. PATENT DOCUMENTS 3,691,557 A     9/1972 Constant (Continued)

FOREIGN PATENT DOCUMENTS

EP     1065623 A2     1/2001

(Continued)

OTHER PUBLICATIONS

International Search Report and Written Opinion, mailed Jan. 18, 2008, from International Application No. PCT/IL2007/001119, filed on Sep. 11, 2007.

(Continued)

*Primary Examiner* — Daniel Wu
*Assistant Examiner* — Mohamed Barakat
(74) *Attorney, Agent, or Firm* — Houston Eliseeva, LLP

(57) ABSTRACT

A radio frequency identification data tag, a system and a method for reading the tag are described. The tag comprises a plurality of diffractive elements which are indicative of data carried by the tag. The diffractive elements have such shape that the dimension of the diffractive elements along one axis is substantially different than the dimension of the elements along the perpendicular axis. The diffractive elements are arranged in columns and rows in accordance with a predetermined layout scheme. In each column, the diffractive element is oriented in a direction other than the direction of the elements in the neighboring columns. The system for reading the tag comprises an array of transmitting (Tx) antennas for emitting an RF transmitted radiation signal at a predetermined polarization towards the tag, and an array of receiving (Rx) antennas configured for collecting re-radiated RF radiation produced by the tag at a polarization orthogonal to the polarization of the transmitting antenna. The system also includes an interrogator unit configured for generating the RF transmitted signal, and processing the RF received signal for reading the data carried tag. The reading is carried out by using amplitude information of SAR images based on the received signal for determining the arrangement of symbol elements in columns and phase information of the SAR images for determining the arrangement of the symbol elements in rows.

22 Claims, 11 Drawing Sheets

U.S. PATENT DOCUMENTS

| | | | | |
|---|---|---|---|---|
| 4,661,983 | A * | 4/1987 | Knop | 382/112 |
| 4,857,891 | A * | 8/1989 | Heltemes | 340/551 |
| 5,268,043 | A * | 12/1993 | McCowen | 148/310 |
| 5,354,521 | A * | 10/1994 | Goodman | 264/429 |
| 5,477,219 | A * | 12/1995 | Zarembo et al. | 340/572.3 |
| 5,554,974 | A * | 9/1996 | Brady et al. | 340/572.6 |
| 6,229,445 | B1 * | 5/2001 | Wack | 340/572.7 |
| 6,529,154 | B1 | 3/2003 | Schramm, Jr. et al. | |
| 6,997,388 | B2 | 2/2006 | Yogev et al. | |
| 7,068,170 | B2 * | 6/2006 | Green | 340/572.1 |
| 7,283,053 | B2 * | 10/2007 | Mickle et al. | 340/572.2 |
| 7,353,994 | B2 * | 4/2008 | Farrall et al. | 235/454 |
| 7,623,624 | B2 * | 11/2009 | Moon et al. | 378/71 |
| 2004/0159708 | A1 | 8/2004 | Yogev et al. | |
| 2005/0280504 | A1 | 12/2005 | Pettus | |
| 2005/0280539 | A1 | 12/2005 | Pettus | |
| 2006/0160208 | A1 * | 7/2006 | Putnam et al. | 435/287.2 |

FOREIGN PATENT DOCUMENTS

| | | |
|---|---|---|
| GB | 1352818 A | 5/1974 |

OTHER PUBLICATIONS

International Preliminary Report on Patentability, mailed Jan. 14, 2009, from International Application No. PCT/IL2007/001119, filed on Sep. 11, 2007.

Mensa, D. L., "High Resolution Radar Cross Section Imaging (2nd ed.)," Boston: Artech House, 1991, pp. 139-185.

Soumekh, M., "Synthetic Aperture Radar Signal Processing," New York: John Wiley & Sons, 1999, pp. xix-xxii, 1-2, 47-49.

* cited by examiner

METHOD AND APPARATUS FOR IDENTIFICATION OF RADIO FREQUENCY TAG

RELATED APPLICATIONS

This application is a Continuation of International application Number PCT/IL2007/001119, filed on Sep. 11, 2007, which in turn claims the benefit under 35 USC 119(e) of U.S. Provisional Application No. 60/844,382, filed on Sep. 14, 2006, both of which are incorporated herein by reference in their entirety.

FIELD OF THE INVENTION

This invention relates to radio frequency identification (RFID) systems, imaging, encoding and decoding methods, and in particular, to a data tag or label used in an identification system.

BACKGROUND OF THE INVENTION

Radio Frequency Identification (RFID) is an automatic identification technology, relying on storing and remotely retrieving data, using devices called RFID tags or transponders. The RFID system consists of two major components—an interrogator/reader and a data carrier, such as a tag or label. They work together to provide the end user with a non-contact solution to uniquely identify people, animals or objects. RFID data tags have recently become widely used for tracking objects, articles and products. Unlike optic barcode systems, RFID does not require line-of-sight and greatly reduces costs associated with the reading of each barcode tag.

An RFID tag is an object that can be attached to or incorporated into a product, animal, or person for the purpose of identification using radio waves. Generally, RF tags can be active (utilizing an internal energy source incorporated with the tag, e.g., a battery) or passive, functioning by using the energy of an external interrogation signal and dependent on energy supplied from a tag reader or an external device.

An active RF tag typically includes an antenna attached to a resonance circuit, which is energized by the received interrogation signal and which, when energized, excites the antenna to transmit a response radio frequency signal. Passive tags do not include an energy source, but only respond to existing radiation by retransmitting, reflecting, or scattering, and typically do not include active elements.

A passive RFID tag that does not depend on a silicon microchip is usually referred to as a chipless tag. Some chipless tags use plastic or conductive polymers instead of silicon-based microchips. Other chipless tags use materials that reflect back a portion of the radio waves beamed at them. They might be implemented also by using etching or conductive ink printing technologies and can be printed directly on articles as etched or screen printed metal-based antennas.

Passive chipless tags have almost unlimited applications in consumer goods and other products and can be used in many different environments. They tend to work over a wider temperature range; these tags also are less sensitive to RF interference. Due to their simplicity in design they are suitable for manufacture with a printing process, and can be printed directly on products and packaging, for example, for 0.1 cents only. The chipless RFID tags are potentially able to replace ten trillion barcodes yearly with their versatility and reliability advantages.

This tag can be placed on or in an article that might be used in retail or for large manufacturing, warehousing and distribution facilities. For instance, in the pharmacological industry the tags can be used for identifying the manufacturer or company entity, the drug class, product's name, and also serial number. Likewise, the tags can carry information such as the drug's dates of manufacture and expiry, batch number, price and even destination data.

There are many different technologies for manufacturing chipless RFID tags, including Surface Acoustic Wave (SAW) devices, Thin Film Transistor Circuits (TFTC) and printed conductive ink stripes.

U.S. Pat. No. 6,997,388 assigned to the Applicant of the present invention describes a chipless radio frequency (RF) data tag. The RF data tag comprises at least one diffraction element that has a dimension of the order of a wavelength of RF radiation and is responsive to RF irradiation, the response produced by the diffraction elements in the data tag being indicative of machine-readable data carried by a data carrier. U.S. Pat. No. 6,997,388 describes a diffraction pattern originated from the diffraction elements that define a symbol in a data that symbolize a data marking information code-language. The diffraction elements are made of materials having a specific RF diffraction absorption, reflection or scattering properties different from that of the substrate material. The reflective material can, for example, be a conductive ink, which is printed on a substrate, which, on RF radiation, causes the diffraction pattern.

One of the techniques used for RFID tag identification is RADAR (radio direction and ranging) that is widely used for detection of objects (targets) navigation and ranging. As in RFID systems, radar also uses a transmitter to illuminate an object and a receiver to detect its existence or position (or both).

For example, U.S. Pat. No. 6,529,154 to Schramm, Jr., et al. describes a method and apparatus for sensing two-dimensional identification marks provided on a substrate or embedded within a substrate below a surface of the substrate. Micropower impulse radar is used to transmit a high rise time, short duration pulse to a focused radar target area of the substrate having two dimensional identification marks. The method includes listening for radar echoes returned from the identification marks during a short listening period window occurring a predetermined time after transmission of the radar pulse. If radar echoes are detected, an image processing step is carried out. If no radar echoes are detected, the method further includes sequentially transmitting further high rise time, short duration pulses, and listening for radar echoes from each of said further pulses after different elapsed times for each of the further pulses until radar echoes are detected. When radar echoes are detected, data based on the detected echoes is processed to produce an image of the identification marks.

U.S. Patent Application Publication No. 2005/0280539 to Pettus describes a system and method for encoding and decoding information by use of radio frequency antennas. The system includes one or more interrogator devices and RFID data tags. The RFID data tags include a plurality of antenna elements, which are formed on a substrate or directly on an object. The antenna elements are oriented and have dimensions to provide polarization and phase information, whereby this information represents the encoded information on the RFID tag. The interrogator device scans an area and uses radar imaging technology to create an image of a scanned area. The device receives re-radiated RF signals from the antenna elements on the data tags, whereby the data tags are preferably represented on the image. The re-radiated RF signals preferably include polarization and phase information of each antenna element, whereby the information is utilized using radar signal imaging algorithms to decode the information on the RF data tag.

A Synthetic Aperture Radar (SAR) technique is known, which performs sophisticated post-processing of radar data and is used to produce a narrow effective beam, thereby significantly increasing the system detection capability and resolution. Synthetic Aperture Radar (SAR) images can be obtained by processing radar scattering data collected over a range of angles and frequencies (see, for example, D. L. Mensa, *High Resolution Radar Cross Section Imaging* ($2^{nd}$ ed.), Boston: Artech House, 1991; M. Soumekh, *Synthetic Aperture Radar Signal Processing*; New York: John Wiley & Sons, 1999).

In SAR, data collection is performed with a radar moving across the line-of-sight, while the target is stationary. On the other hand, an Inverse SAR (ISAR) refers to the case when the target is moving (usually rotated), while the radar is stationary. Radars can operate either in a continuous wave (CW) mode or pulsed mode and employ one or more transmitting and receiving antennas.

The motion of the transmitting and/or receiving antenna may be provided mechanically or simulated by the antennas' array electronic switching. The optimum geometric resolution that can be provided with SAR is determined by centre frequency and bandwidth of the transmitted signal and the aperture angle, over which the antenna, along the straight path, illuminates the target area. The SAR technique has been applied in a very wide frequency range up to 100 GHz, which corresponds to wavelengths down to 3 mm.

The basic design of a synthetic aperture radar system can be enhanced in various ways to collect more information. Most of these methods use the same basic principle of combining many pulses to form a synthetic aperture, but they may involve additional antennas or significant additional processing.

For example, the image resolution can be enhanced by using signal polarization and/or signals' interferometry. Specifically, by emitting a mixture of polarized waves and using receiving antenna with a specific polarization, several different images of the target can be collected from the same series of pulses.

SAR systems record both amplitude (brightness) and phase of the backscattered echoes, although the phase of a single SAR image is of no practical use. On the contrary, Interferometric SAR (InSAR) is a technique where two SAR images acquired with a slightly different incidence angle are combined producing a phase interference image called an interferogram. If two SAR images from slightly different viewing angles are considered (interferometric pair) their phase difference (interferometric fringes) can be usefully exploited to improve the image resolution. The interferometric fringes image is derived as the phase of the SAR interferogram, which is the complex image formed by cross-multiplying the two SAR images.

SUMMARY OF THE INVENTION

According to a first aspect of the present invention, a novel chipless radio frequency identification (RFID) data tag is provided that can be target interrogated by a radar-type reader system. The tag is associated with a product or merchandise and can be either placed or incorporated therein. The RFID data tag comprises a plurality of diffractive elements which are indicative of machine-readable data carried by the tag. The diffractive elements have such shape that the dimensions of these diffractive elements along one axis are substantially different than the dimension of the elements along the perpendicular axis. Moreover, the diffractive elements are arranged in columns and rows in accordance with a predetermined layout scheme. In each column, the diffractive element is oriented in a direction other than the direction of the elements in the neighboring columns.

According to one embodiment of the present invention, the data information code of the tag is defined by the presence or absence of the diffractive elements in columns and by the numerical number of the row corresponding to the elements. The absence of a diffractive element in the column represents a zero while the presence of the diffractive element represents a certain value related to the numerical number of the row corresponding to the element.

According to another embodiment of the present invention, the data information code of the tag is defined by the type of the diffractive element. For example, the diffractive elements can be single strip elements and/or double strip elements.

According to an embodiment of the present invention, the directions of each two diffractive elements in neighboring columns are perpendicular to each other.

According to an embodiment of the present invention, at least a part of the diffractive elements introduces redundant information in a content of the tag for data error correction. The redundant information is based on at least one error correction scheme selected from parity bits and checksum.

According to an embodiment of the present invention, at least a part of the plurality of diffractive elements represents fiducial marks positioned on the tag in predefined places.

According to one embodiment of the present invention, the diffractive elements are deposited on a substrate layer.

According to another embodiment of the present invention, the diffractive symbol elements are incorporated into the structure of an article with which the tag is associated.

According to a further embodiment of the present invention, the diffractive elements are made of a material capable of absorbing, scattering or reflecting RF radiation.

According to another general aspect of the present invention, there is provided a system for reading the RFID data tag of the present invention. The system includes an array of transmitting (Tx) antennas, an array of receiving (Rx) antennas, and an interrogator unit. The array of transmitting (Tx) antennas is configured for emitting an RF transmitted radiation signal at a predetermined polarization towards the tag. The array of receiving (Rx) antennas is configured for collecting re-radiated RF radiation produced by the tag in response to the RF transmitted radiation signal at a polarization orthogonal to the polarization of the transmitting antenna, and generating RF received signal having amplitude and phase information indicative of the data carried by the tag. The interrogator unit is configured for generating the RF transmitted signal emitted towards the tag, and processing the RF received signal for reading the data carried tag by using the amplitude information of SAR images based on the received signal for determining the arrangement of symbol elements in columns and phase information of the SAR images for determining the arrangement of the symbol elements in rows.

According to an embodiment of the present invention, the array of transmitting (Tx) antennas and the array of receiving (Rx) antennas are switching antenna arrays with non-symmetric transmit/receive functions. The term "non-symmetric" herein refers to the fact that the number of transmitting antennas is not equal to the number of receiving antennas.

According to an embodiment of the present invention, the interrogator unit includes an RF Front-End unit coupled to said array of transmitting (Tx) antennas and said array of receiving (Rx) antennas, an RF module coupled to the RF Front-End unit, a Control unit and a Digital Signal Processor (DSP) module coupled to the RF Front-End unit and to the RF module, and, a Power Supply unit The RF Front-End unit includes one or more output amplifiers, one or more input amplifiers, a control logic unit and RF switches. The RF module is configured for generating the transmitted signal receiving the signals scattered from the tag and providing down conversion of the frequency. The DSP unit is configured for processing the received signals by using the amplitude and phase information incorporated in the received signals. The control unit is configured for controlling the operation of the RF Front-End unit and the RF module.

According to a further general aspect of the present invention, there is provided a method for reading the RFID data tag of the present invention. The method includes generating and emitting an RF transmitted signal at a predetermined polarization towards the RFID data tag. The RF electromagnetic signal can be in the microwave range of (1 GHz-1000 GHz). Further, re-radiated RF radiation scattered by the tag in response to said RF radiation signal is collected by the receiving antennas and transferred to the interrogator. The received signal contains data within the amplitude and phase information which are indicative of the data carried by the tag. According to the present invention, the collection of the signal by the receiving antennas is carried out at a polarization orthogonal to the polarization of the RF transmitted signal. Then, the RF received signal is processed for reading the data carried tag by using the amplitude information of SAR images based on the received signal for determining the arrangement of symbol elements in columns and the phase information of the SAR images for determining the arrangement of the symbol elements in rows.

The images of the tag are obtained by employing a SAR processing for obtaining horizontal resolution of the tag, and Interferometric SAR (InSAR) processing for obtaining vertical resolution of the tag. Specifically, the determining of the arrangement of diffractive elements in columns includes SAR processing, whereas the determining of the arrangement of diffractive elements in rows includes an Interferometric SAR (InSAR) processing. Preferably, but not mandatory, the method can utilize novel super-resolution SAR image processing.

According to an embodiment of the present invention, the processing of the RF received signal includes: reconstructing an initial image of the tag, correcting distortions of the tag's pattern in the initial image, detecting and correcting errors in the initial image, and deciphering and decoding the data carried by the tag.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
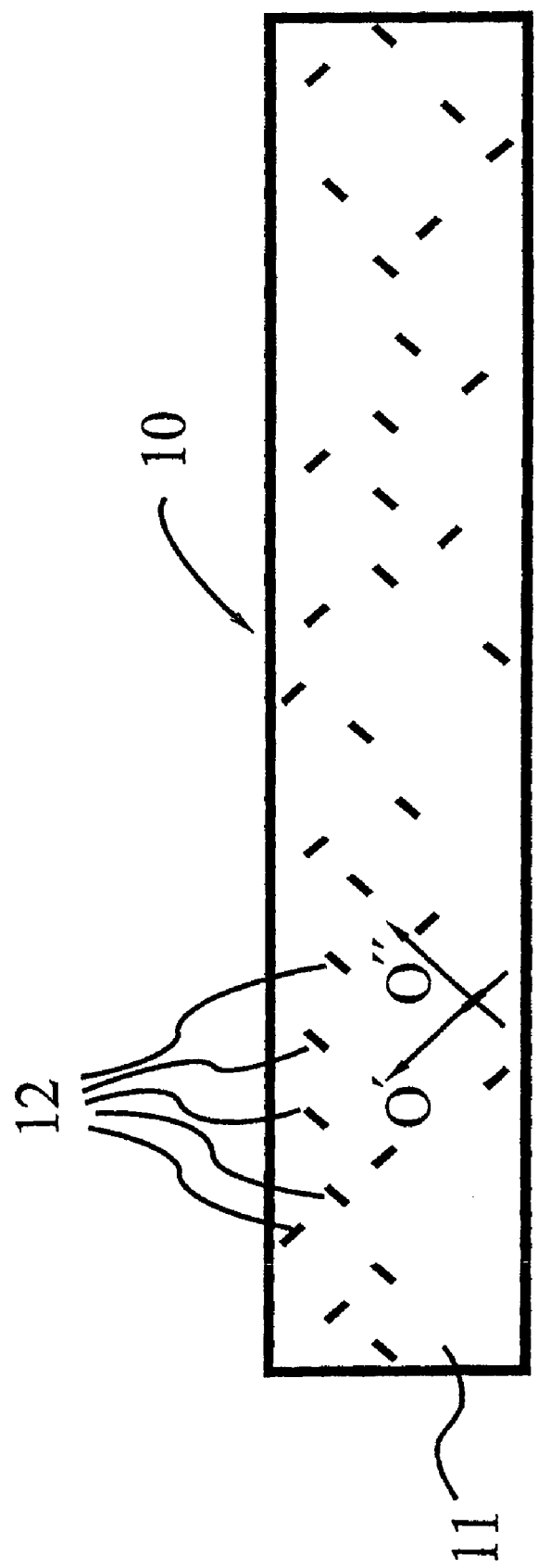
FIG. 1A illustrates schematically an example of an RFID data tag, according to one embodiment of the invention.

The principles and operation of the information-carrying multi-bit data tag and identification system according to the present invention may be better understood with reference to the drawings and the accompanying description. It should be understood that these drawings which are not necessarily to scale, and examples in the description, are given for illustrative purpose only and are not intended to limit the scope of the invention. The same reference numerals will be utilized for identifying those components, which are common in the multi-bit data carriers shown in the drawings throughout the present description of the invention. Examples of constructions, materials, dimensions, and manufacturing processes are provided for selected elements. Those versed in the art should appreciate that many of the examples provided have suitable alternatives which may be utilized.

The present invention describes a novel chipless RFID data tag that can be target interrogated and read by a radar-type identification system based on Synthetic Aperture Radar (SAR) technique together with Interferometric Synthetic Aperture Radar (InSAR) technique. The images of the tag are obtained by processing radar scattering data collected over a broad range of angles and frequencies.

Referring now to the drawing, FIG. 1A schematically illustrates an example of an RFID data tag 10, according to one embodiment of the invention. The RFID tag 10 comprises a substrate layer 11 whose surface is patterned to have a plurality of diffractive elements 12. The substrate layer 11 can, for example, be made of paper, cardboard, fabric, polymeric foils or solid materials. The diffractive symbol elements 12 can be printed on the RFID tag 10, for example, by using conductive ink and/or by using any other conductive material.

According to one embodiment, the diffractive elements 12 of the RFID data tag 10 are conductive elements. According to another embodiment, when the substrate layer 11 is conductive and/or the tag 10 is placed on a conductive object, the tag can comprise a plurality of holes or other absorbing elements. In both cases, the relative position of the elements 12 with respect to each other and amplitude of the response on the interrogation signal can be indicative of the information encoded on the tag 10.

Figure 1B:
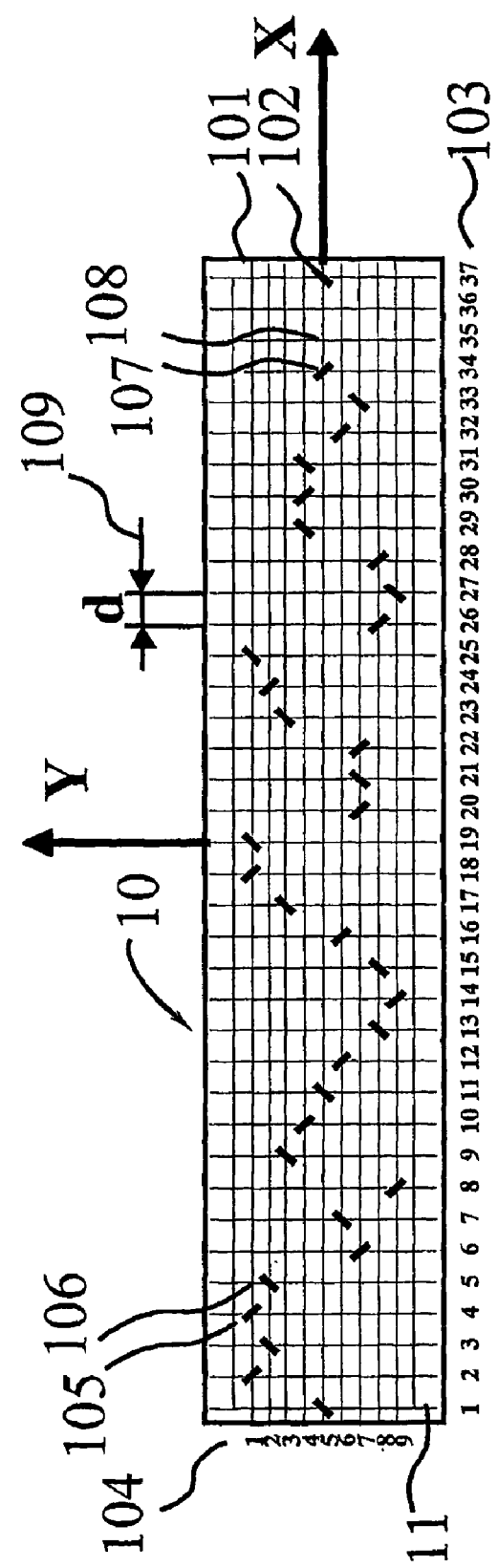
FIG. 1B illustrates schematically a plan view of an exemplary RFID data tag having an arrangement of the symbol elements according to one embodiment of the invention.

According to the invention, the diffractive elements 12 are arranged on the substrate layer 11 oriented with respect to each other in the manner that will be described hereinbelow. According to one embodiment of the present invention, the diffractive symbol elements are arranged in columns and rows in accordance with a predetermined layout scheme. FIG. 1B illustrates an exemplary layout scheme for the diffractive elements 12 of the tag of the present invention. In the description, the center-line of the tag is referred to as a horizontal direction and any shift of a diffractive element from the center-line in a perpendicular direction is referred to as a vertical direction. According to this embodiment, each diffractive element is in the form of a strip and has a unique horizontal and vertical position in one of m columns 103 and n rows 104 of the layout. In the example shown in FIG. 1B, the tag has 37 columns and 9 rows. When desired, any number of the tag rows 104 and columns 103 and the position of the symbol diffractive 12 in the rows and columns can be implemented. It should be understood that although the diffractive elements 12 in the form of a strip are shown in FIGS. 1A and 1B, the shape of the diffractive element can be different than the strip. Generally, the diffraction elements 12 can be any asymmetric elements having such shape that produces a cross polarized scattered signal. It should be understood that the number of the tag rows 104 and columns 103, as well as type of the symbol define a capacity of the tag. It should be noted that grid lines 101 as well as rows and columns numbers are shown in FIG. 1B for illustration purposes only and do not appear on the real tag.

According to one embodiment of the present invention, the data information code of the tag is defined by the presence or absence of the diffractive elements 12 in columns 103 and the numerical number of the row 104 corresponding to the elements. In other words, the diffractive elements 12 can represent symbols, and each unique position of the diffractive element represents the bit of information carried by the tag. For example, the absence of the diffractive element in a column (in any row) can represent a "0" (zero), while the presence of the element in a specific row in the column can represent a certain value. The value can depend on the type of the diffractive element.

For example, when all the diffractive elements are similar strips (as shown in FIG. 1B), this value can be equal to the numerical number of the row. Specifically, when the total number of the rows equals 9, the numerical number of the row in which the symbol element is positioned in a certain column represents a decimal value of this column. For example, a decimal number which is encoded in the tag shown in FIG. 1B is 5121276934568986311777321898444675005.

The coding scheme shown in FIG. 1B is referred to as a decimal encoding scheme. It should be understood that the coding logic depends on the number of the rows. Generally, a code having a radix different than that of the decimal code can also be used.

Figure 1C:
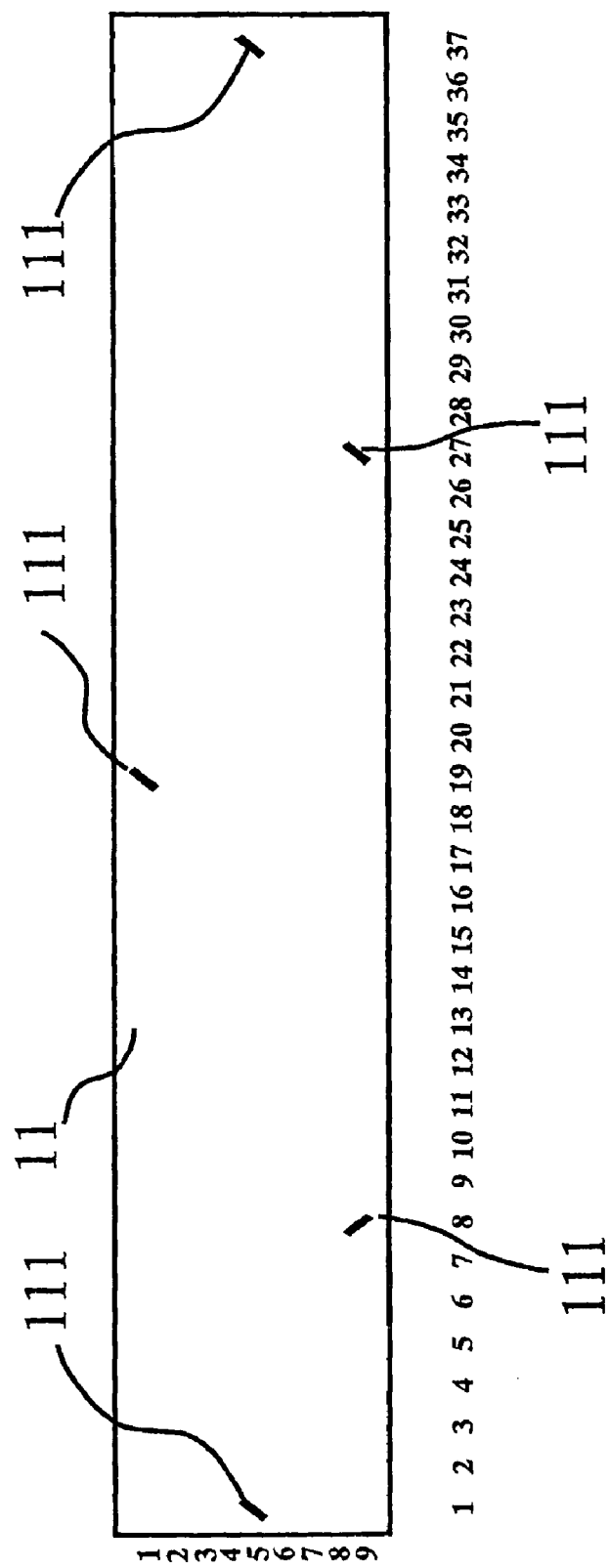
FIG. 1C shows an example of arrangement of fiducial marks on the tag shown in FIGS. 1A and 1B.
Figure 1D:
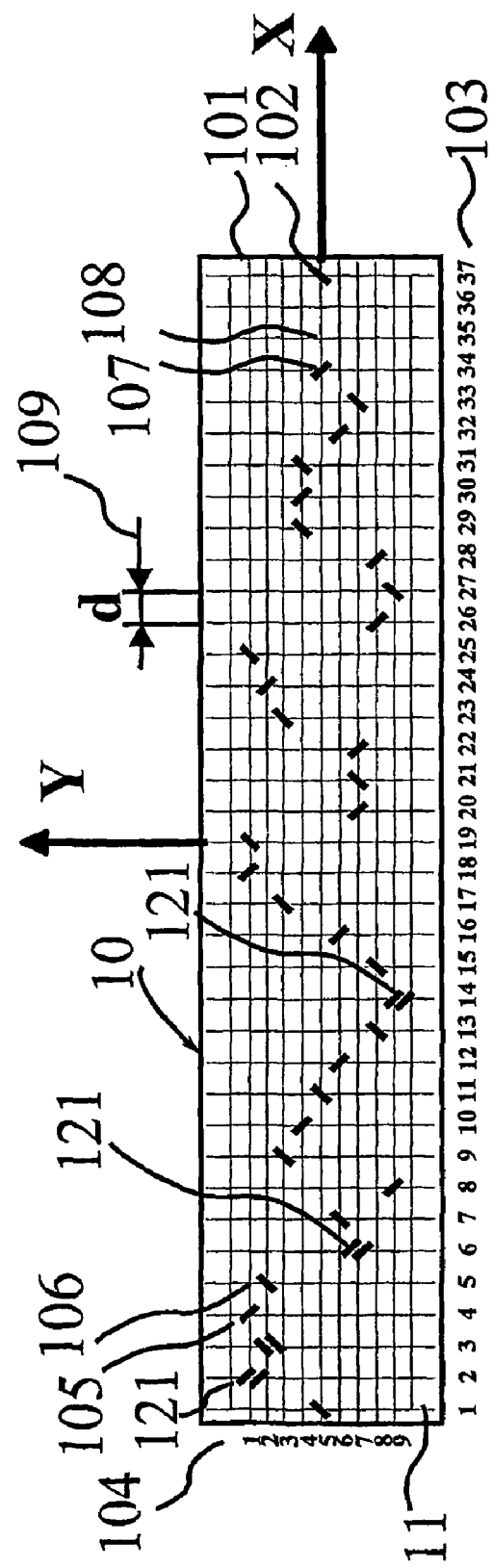
FIG. 1D illustrates schematically a plan view of another exemplary RFID data tag having an arrangement of the symbol elements according to another embodiment of the invention.

Referring to FIG. 1D, a plan view of another exemplary RFID data tag having an arrangement of the symbol elements according to another embodiment of the invention is illustrated. This tag also has 37 columns and 9 rows. In this example, there are two types of diffractive elements, a first type of the elements is a single strip element (see for example, elements 105 and 106), whereas a second type of the diffractive elements is a double strip element (see, for example, elements 121). Accordingly, the radix of this tag is different than the radix of the tag shown in FIG. 1B. Specifically, a base of the system of numbers in this case is 19 (unlike the base of 10 of the tag shown in FIG. 1B). In this case, the numerical code can have the form of 0123456789ABCDEFGHI.

It should be understood that the value of a tag that has different diffractive elements can be equal to the numerical number of the rows multiplied by the number of ways to represent each element plus an option of presence or absence of an element. For example, in the case, where there are two types of symbols, and the total number of rows is equal to 9, the basis of the tag has the value of 9×2+1=19.

The coding scheme shown in FIG. 1D is referred to as an alphanumeric encoding scheme. For example, an alphanumeric data which is encoded in the tag shown in FIG. 1D is 5AB12G69345681863117773218984446 75005 with a basis of 19.

It should be noted that the relative dimension and position of the diffractive elements 12 are shown in FIGS. 1A, 1B, 1C, 1D and further drawings only as non-limiting examples, and are not drawn to scale. The element 12 can have a dimension of the order of a half-wavelength of RF electromagnetic radiation (above 0.1 mm, considering that the RF frequency range is about $10^9$ Hz-$10^{12}$ Hz). According to the invention, radio frequency (RF) electromagnetic radiation is utilized for irradiating the diffractive elements 12. Depending on the frequency of operation, a horizontal pitch (the distance between the columns) can be in the range of 2 mm-4 mm and a vertical pitch (the distance between the rows) can, for example, be in the range of 1 mm-2 mm. However, other examples of the tag's pitches are also possible.

According to the present invention, the diffractive elements 12 of the tag 10 have such shape that the elements' dimension along an axis O' is substantially different (e.g., larger) than the elements' dimension along a perpendicular axis O". For example, the elements 12 can be in the form of narrow strips. Such a provision provides the possibility to reduce background clutter. For this purpose, transmitting antennas (not shown) and receiving antennas (not shown) utilized in a system for reading the tag of the present invention have orthogonal polarizations. An example of the system for reading the tag will be shown hereinbelow with reference to FIG. 2A.

Thus, in one embodiment, the transmitting antennas produce a horizontally polarized field, while the receiving antennas receive a vertically polarized field. It should be understood that the direction of polarization of the transmitting and receiving antennas can be interchanged and, in general, any two orthogonal polarizations can be employed for transmission and reception.

According to the invention, the tag elements 12 are designed to produce strong cross-polarized response, while the clutter is mainly co-polarized. Specifically, the elements 12 are designed to produce a strong vertically polarized field, when illuminated by a horizontally polarized field emitted from the transmitting antenna and vice versa.

The electromagnetic wave emitted by the transmitting antennas and scattered by different obstacles, walls, etc. impinges upon the receiving antennas mainly at the same polarization as it was originated. Since the receiving and transmitting antennas are cross-polarized, the electromagnetic field of the obstacles and walls will be significantly attenuated, thus preventing a "blinding", i.e., an overload of the receiver. On the other hand, according to the invention, the diffractive data elements 12 are slanted and take intermediate direction between direction of polarizations of the transmitting and receiving antennas. Therefore, the elements 12 can scatter the electromagnetic field and produce both orthogonal polarization components, which can be accepted by the receiving antenna.

It should be noted that radar imaging algorithms used for generating images of the tag may produce undesired artifacts, when a strong coupling exists between the neighboring tag elements. Such artifacts may make the information decoding difficult, and thus limit the information capacity of the tag. The coupling between the elements is maximal when the neighboring elements are parallel to each other.

According to one embodiment the invention, in order to reduce coupling between neighboring elements in the tag, in each column, the diffractive element is oriented in a direction other than the direction of the elements in the neighboring columns. Preferably, in each two neighboring columns the symbol elements are oriented at right angles between each other, as shown in FIGS. 1A, 1B and 1D. Thus, the orientations of the elements in each two neighboring columns are orthogonal to each other. Such arrangement of the elements reduces coupling between the elements of the neighboring columns, because when the elements of the neighboring columns are orthogonal to each other, electric current flowing along a certain element does not induce a current in the elements of the neighboring columns.

According to an embodiment of the present invention, the entire set of the diffractive elements positioned in the tag of the present invention can include a first sub-set of the diffractive symbol elements representing the information about a product and a second sub-set of the diffractive elements used as diffractive reference elements (e.g., fiducial marks) intended for better distinguishing the symbol elements, recognition of the tag's border and orientation as well as for more reliable identification of the tag.

Moreover, when desired, the tag of the present invention can include additional diffractive symbol elements introducing redundant information (e.g., parity bits, checksum, etc.) in the tag's content that can be used for data error correction. The error correction can, for example, be used in order to avoid detection failures when the tag is damaged. Error correction algorithms are known per se in the art, and therefore will not be described herein below.

FIG. 1C shows an example of the second sub-set of the diffractive elements representing fiducial marks 111 positioned on the tag of FIGS. 1A and 1B. As can be seen, the fiducial marks 111 are positioned in predefined places and can, for example, be designated for the specification of the tag's borders, and defining its relative (to the reader) position and alignment in the reading process.

When desired, additional diffractive symbol elements (not shown) can further be positioned on the tag for data error correction. These elements (indicative of error correction symbols) can, for example, be arranged in one or more last columns of the tag, for example, for the tag shown in FIGS. 1A and 1B such additional diffractive symbol elements can be positioned in columns 34-36, although other implementations of placement of the error correction symbol elements are also possible with providing additional number of columns and/or rows. Preferably, but not mandatory, that the fiducial marks, as well as the data correction symbols, are visually identical to the symbol elements representing the information about a product.

Figure 5:
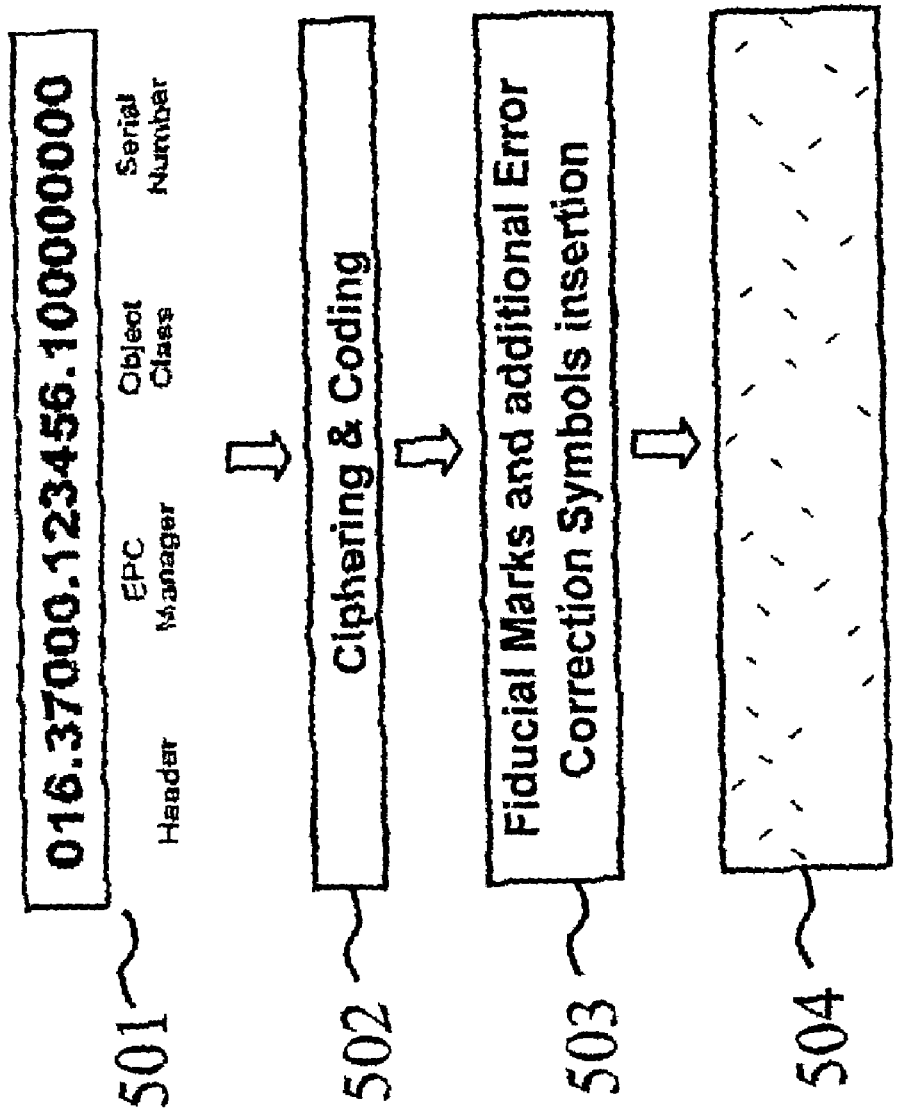
FIG. 5 shows a schematic illustration of a method of generation of a layout of elements of a tag, according to one embodiment of the present invention.

Referring to FIG. 5, a schematic illustration of a method of generation of a layout of elements of a tag 504 is illustrated, according to one embodiment of the present invention. According to this embodiment, product information or other input data 501 are processed by ciphering (scrambling) and/or coding algorithms 502 to provide product code data security and protection. The product information can, for example, include an Electronic Product Code (EPC) that contains the following main components: General Manager Number, Object class number, Batch Start Serial Number, and Batch Ends serial number. Thereafter, a layout of symbol elements corresponding to the input data is generated. When desired, additional information about fiducial marks, and other auxiliary and redundant data can be incorporated in the coding algorithm (block 503). Finally, the tag's generation algorithm produces the tag's graphical file 504, where the row and column positions of each symbol represent the original input encoded data, and other auxiliary and redundant data. This graphical file 504 can be used for printing the tag's layout on a product or label.

Since the tag has conductive or absorptive elements, it scatters the incident wave and the backscattered (re-radiated) field carries the information about the symbol and marks of the tag. In operation, this re-radiated field is received by an identification system, which compares it with the transmitted (egress) signal, processes and recovers the information data carried by the tag.

Figure 2A:
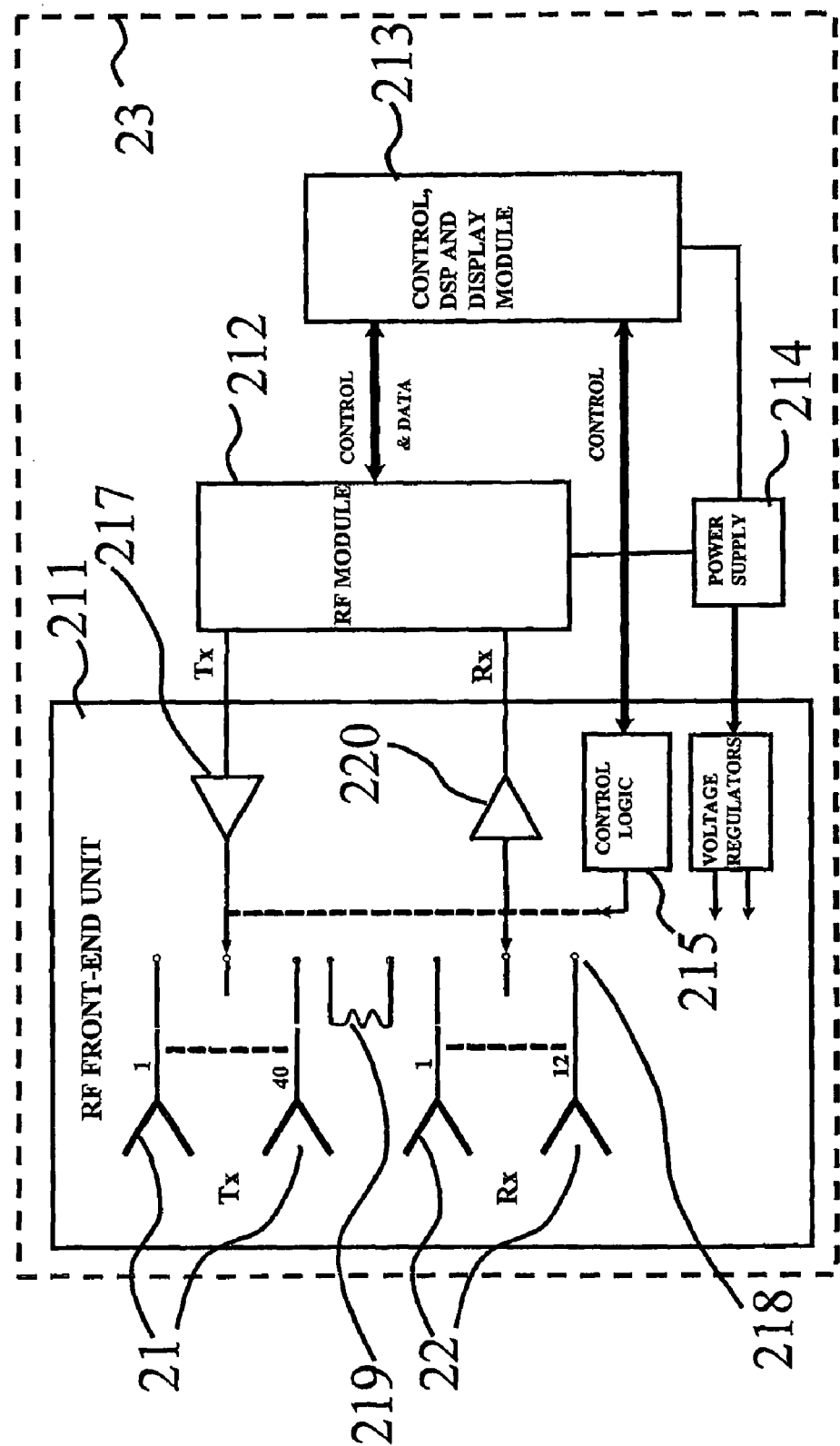
FIG. 2A shows a schematic block diagram of an identification system for reading information stored in the data tag of the present invention, in accordance with an embodiment of the present invention.

Referring to FIG. 2A, a schematic block diagram of an identification system for reading information stored in the data tag of the present invention is illustrated, in accordance with an embodiment of the present invention. It should be noted that the blocks in FIG. 2A are intended as functional entities only, such that the functional relationships between the entities are shown, rather than any physical connections and/or physical relationships.

The identification system of the invention is based on a coherent radar system operating at millimeter-wave frequencies. For example, the identification system can operate in the frequency range of 3 GHz to 300 GHz, and preferably in the range of 59 GHz to 64 GHz or 116 GHz to 126 GHz, in order to comply with the Federal Communication Committee (FCC) regulations.

The identification system of the present invention includes an array of transmitting (Tx) antennas 21 configured for emitting an RF transmitted radiation signal at a predetermined polarization towards the tag (not shown). As described above, the tag can be a part of a product or merchandise. The system also includes an array of receiving (Rx) antennas 22 configured for collecting re-radiated RF radiation (absorbed, scattered or reflected) produced by the tag in response to the RF transmitted radiation signal at a polarization orthogonal to the polarization of the transmitting antenna, and generating RF received signal having amplitude and phase information indicative of the data carried by the tag. The system of the present invention further includes an interrogator unit 23 configured for generating the RF transmitted signal emitted towards the tag, and processing said RF received signal for reading the data carried by the tag by using the amplitude information of SAR images based on the received signal for determining the arrangement of symbol elements in columns and phase information of the SAR images for determining the arrangement of the symbol elements in rows.

The transmitting antenna 21 and the receiving antenna 22 have small radiating apertures to provide and intercept wide beams, covering all area of the tag. The Tx and Rx antennas can be implemented as planar or non-planar structures. Examples of the Tx and Rx antennas suitable for the purpose of the present invention include, but are not limited to, horn antennas, slot antennas, strip antennas, patch antennas, parabolic antennas, etc. Preferably, the antenna structure might be a lattice or phased array that realizes partially or completely electronic scanning of the tag without the necessity to move the interrogator unit 23 relatively to the tag mechanically.

The interrogator unit 23 includes an RF Front-End unit 211, an RF module 212 coupled to the RF Front-End unit 211, a control unit and Digital Signal Processor (DSP) (module 213) coupled to the RF Front-End unit 211 and to the RF module 212, and a power supply unit 214. The control and DSP module 213 can be equipped with a Display unit.

The RF Module 212 performs the function of transceiver. In particular, it generates the transmitted signal, and obtains the received signals scattered from the tag by the receiving antennas 22.

The control unit and DSP module 213 performs control of the operation logic of the RF Front-End unit 211 and the RF module 212. In operation the module 213 receives data from the RF module 212, processes these data by using the amplitude and phase information incorporated within the signals scattered from the tag, and presents the information data of the tag in a required format. The power supply unit 214 provides required voltages to the system.

The RF Front-End unit 211 includes an output amplifier 217, an input amplifier 220, a control logic unit 215, and RF switches 218. In transmitting mode, the RF Front-End unit 211 receives transmitted signals from an output Tx of the RF Module 212, and amplifies these signals by the amplifier 217, activates the Tx antennas 21 for sequential illuminating the tag by mm-wave electromagnetic field, forms in each Tx channel the field diagram and emits it towards the tag by the Tx antennas 21. In receiving mode, the RF Front-End unit 211 receives the tag's backscattered RF field by the receiving antennas 22, forms Rx channels, amplifies the received signals in the Rx channels by the amplifier 220 and provides the amplified signal to an Rx input of the RF Module 212. The switching of the Tx and Rx channels is controlled by the control unit of the module 213 through the control logic unit 215.

Figure 2B:
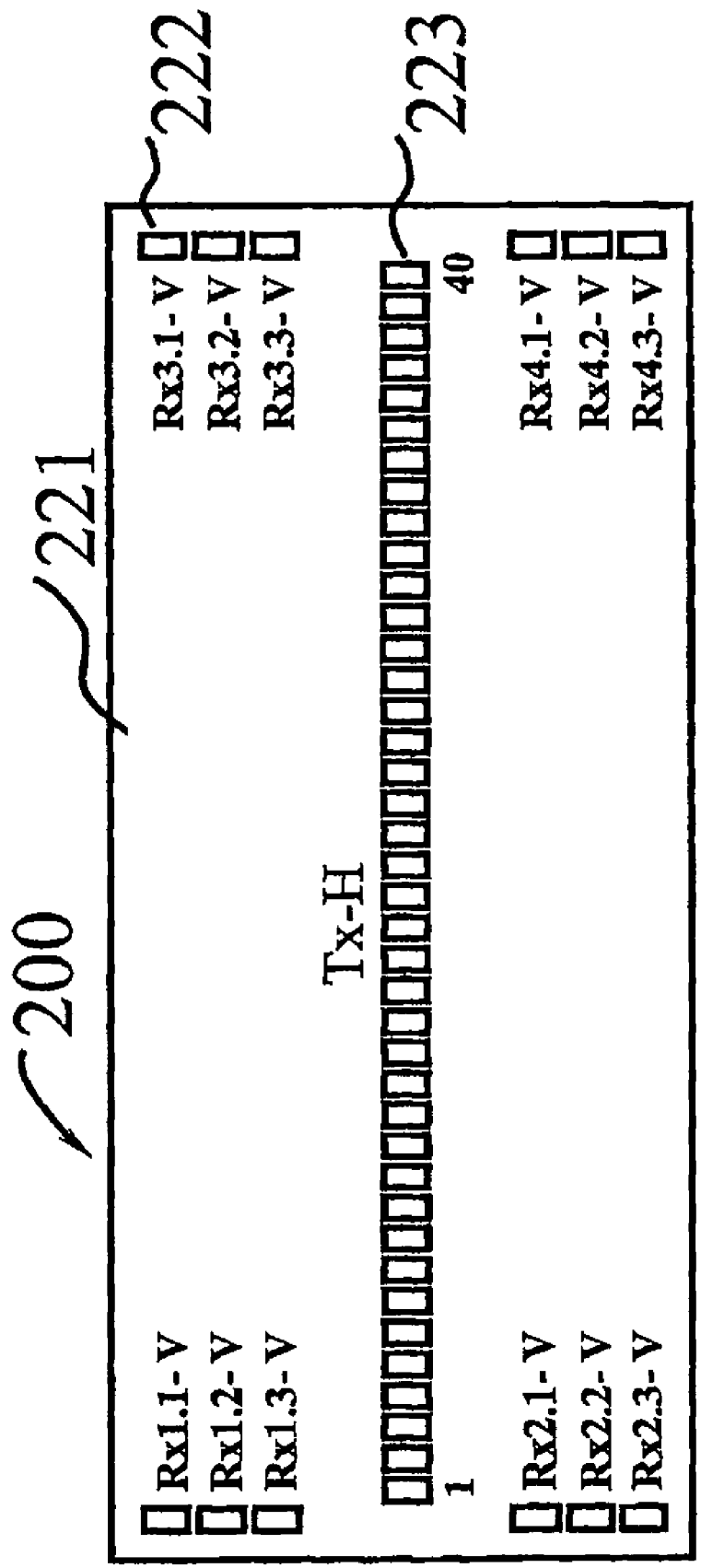
FIG. 2B shows an example of a configuration of the antennas of the identification system in FIG. 2A.

FIG. 2B shows a layout configuration 200 of an Rx antenna array 222 and an Tx antenna array 223, according to one embodiment of the present invention. According to this embodiment, the Tx and Rx antennas of the arrays 222 and 223 are of a patch type, and assembled together with their electronics components (not shown) on a surface of a planar board 221. The layout configuration 200 is devised in accordance with the tag's dimensions, amount of elements and distances (pitches) between the elements of the tag in columns and rows. Specifically, the total horizontal (azimuth) aperture of the Tx antennas (i.e. scanning angles range) and Tx channels quantity depend on the pitch of the tag's elements and the maximal distance between the tag and the antenna arrays.

For example, when the pitch is 3 mm, i.e. close to the half wavelength of the system operating in the V-band (59 GHz-64 GHz), the total antennas' aperture can be 320 mm. In this case, as shown in FIG. 2B, the amount of the Tx channels can be equal to 40, while the amount of the Rx channels can be equal to 12, although in other embodiments these parameters might be different. As shown in FIG. 2B, the polarizations of the Rx and Tx antenna arrays are orthogonal. Specifically, the row of the Tx antenna array 223 has a horizontal linear polarization, whereas the columns of the Rx antenna array 222 have a vertical linear polarization. In general, any two orthogonal polarizations can be employed for transmission and reception. The antennas can perform electrical steering (scanning) in azimuth and elevation directions.

Figure 2C:
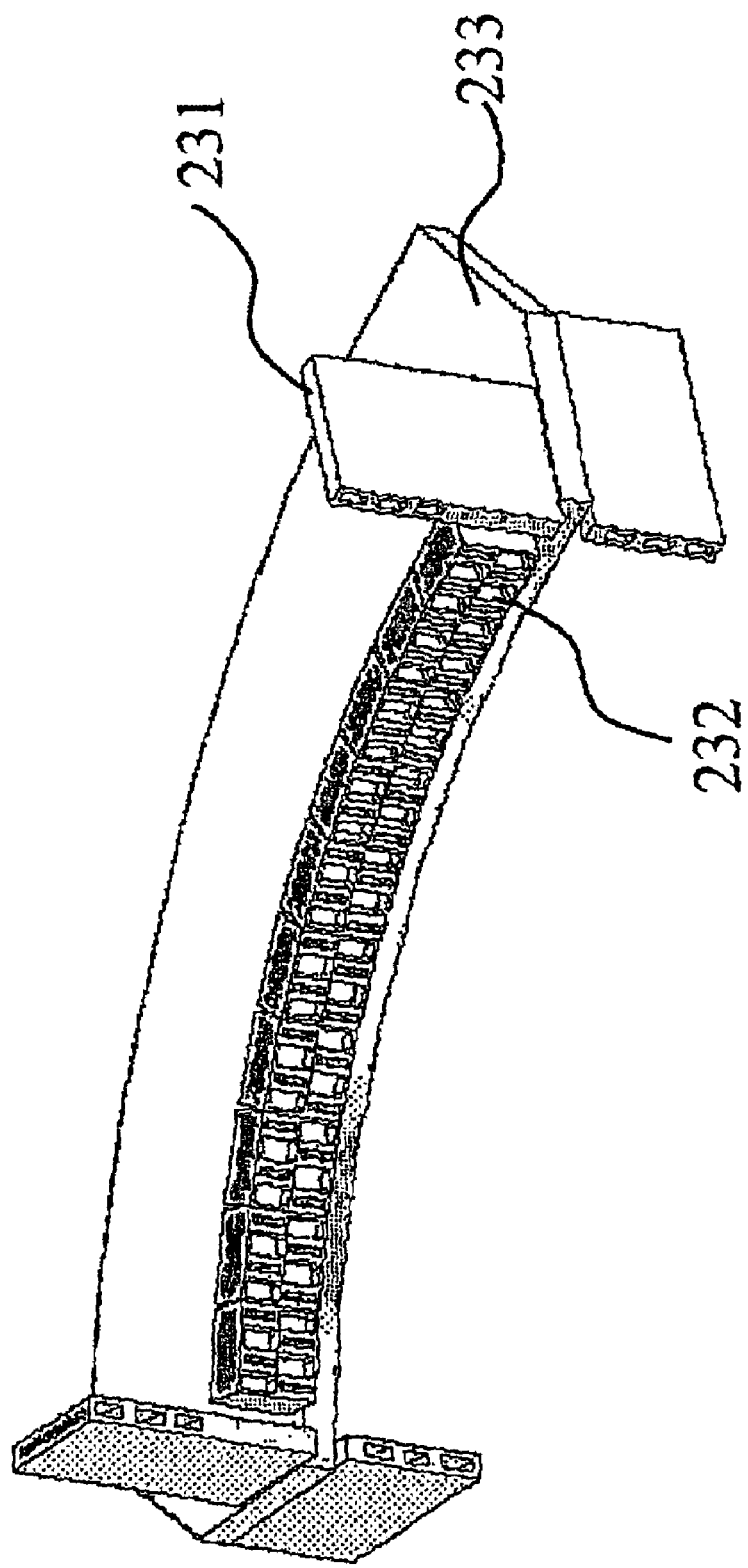
FIG. 2C shows another example of a configuration of the antennas of the identification system in FIG. 2A.

FIG. 2C shows another possible implementation of the layout of the Rx and Tx antennas configured in accordance with another embodiment of the present invention. In this embodiment, an option is considered when Tx antenna array 232 and Rx antenna array 231 antennas are implemented as separate groups of horn antennas modules mounted near an edge of a board 233. As shown in FIG. 2C, the antennas of Tx array 232 are arranged in a staggered relationship with respect to each other.

The identification system of the present invention employs an algorithm that uses amplitude and phase information of the tag's image. Thus, there are strict requirements for total amplitude and phase stability of the RF Front-End's electronics. Moreover, phase shift monotony of the frequency response path of Tx-Rx channels is required. To meet these requirements, the Tx and Rx channels can be dynamically calibrated. For this purpose, a part of the transmitted signals from the Tx channel, attenuated by a dedicated calibration channel 219, can be forwarded to the Rx channel. Thus, the system can track the amplitude and phase changes of the RF Front-End electronics and "dynamically" correct (compensate) the amplitude and phase changes.

As described in the background section, conventional SAR systems employ antenna movement to obtain the synthetic aperture affect without using a physically large antenna. According to the present invention, in order to avoid physical movement, it was suggested to return to a "physically large" antenna comprising multiple elements. The data collection is achieved by switching the receiving and transmitting antenna elements on and off. Usually, only one transmit/receive pair of antenna elements is activated at any given moment of time. Generally, more than one receiving antenna can be activated simultaneously to achieve faster data collection at the expense of using multiple receiving circuits. It should be understood that the use of switched arrays SAR data collection of the present invention differs from the use of phased arrays employed to feed reflectors and lenses in various radars and communication systems configured to change the beams direction.

Generally, a method for reading the RFID data tag of the present invention includes generating and emitting an RF transmitted signal at a predetermined polarization towards the RFID data tag. Further, re-radiated RF radiation produced by the tag in response to said RF radiation signal is collected for generating RF received signal having amplitude and phase information indicative of the data carried by the tag. According to the present invention, the collection is carried out at a polarization orthogonal to the polarization of the RF transmitted signal. Then, the RF received signal is processed for reading the data carried tag by using the amplitude information of SAR images based on the received signal for determining the arrangement of symbol elements in columns and the phase information of the SAR images for determining the arrangement of the symbol elements in rows.

Conventional SAR systems employ transmitting and receiving antennas having substantially similar configurations. In particular, the same antenna is often used for both functions. On the other hand, the proposed switched antenna arrays are based on "non-symmetric" Tx/Rx antenna arrangements to achieve special system goals, as will be described herebelow.

According to one embodiment of the present invention, the horizontal antenna array (223 in FIGS. 2B and 232 in FIG. 2C) is used for transmission of electromagnetic radiation, and providing horizontal resolution (tag's columns) of tag's diffractive elements, whereas the vertical antenna array(s) is(are) used for receiving radiation, and providing vertical resolution (tag's rows). It should be noted that horizontal resolution of the tag can be obtained by either a regular SAR processing or, preferably, by a super-resolution SAR processing, as will be described hereinbelow. On the other hand, vertical resolution can be obtained by either a regular SAR processing or, preferably, by Interferometric Synthetic Aperture Radar (InSAR) processing, leading to a reduced number of antennas. Thus, essentially different transmit/receive antenna arrangements can be implemented, when using a switched array concept.

A regular SAR processing restores reflectivity in the center of each pixel within an image (comprising a regular Cartesian grid of pixels) independently of all the others. In fact, it can achieve the best least-squares match of the single pixel reflectivity to the measured data irrespective of all other pixels. This type of processing can produce good results for sparsely placed scatterers and can achieve resolutions of worse (usually much worse) than half a wavelength. However, such a regular SAR processing tends to fail in cases of densely packed objects.

On the other hand, methods employing a-priori information about the number of scatterers or their properties and/or allowing an irregular positioning of the scatterers are generally referred to as super-resolution SAR techniques.

A variety of super-resolution techniques have been described in the art. The present application proposes a novel type of a super-resolution algorithm designed for a tag comprising N symbols placed with a-priori known intervals (pitches). The least-squares match is used for the scattering model based on N scatterers to the received data. In that sense the proposed approach generalizes the conventional SAR processing to simultaneously restore the amplitudes of N pixels instead of computing each pixel independently. Indeed, when N=1 the proposed technique is reduced to the regular SAR processing based on near-field back projection/propagation.

An algorithm for a super-resolution SAR processing is described hereinbelow, in accordance with an embodiment of the present invention.

Transmitting and receiving antenna locations are denoted $\{r_p^t\}_{p=1}^{N_t}$ and $\{r_q^r\}_{q=1}^{N_r}$, where $N_t$ and $N_r$ are the total number of the transmitting and receiving antennas respectively. We seek image amplitudes at points $\{r_n\}_{n=1}^{N}$, where N is the total number of the tag's elements. A single frequency image is computed at the frequency f and the corresponding wave number $k=2\pi f/c$, where c is the speed of light.

The tag model considers the tag's diffractive elements as equally spaced point scatterers of amplitudes $s_n$ located at the locations $\{r_n\}_{n=1}^{N}$. The received signal at a receiving antenna located at $r_q^r$ due to signal transmitted by a transmitting antenna located at $r_p^t$ can be expressed as $$G_i = G(r_p^t, r_q^r) = \sum_{n=1}^{N} s_n H_{i,n} + \varepsilon_i \quad (1)$$

$$i = p + (q-1)N_t,$$

where $$H_{i,n} = \frac{e^{-jk(|r_n - r_p^t| + |r_n - r_q^r|)}}{|r_n - r_p^t||r_n - r_q^r|} \quad (2)$$

and $\varepsilon_i$ denotes the noise encountered in the measurement due to various factors.

For simplicity, we assume isotropic antennas and scatterers. Antenna characteristics can be easily accounted for if measured or computed a-priori. The data model (1) can be expressed in a matrix form, to wit:

$$\underline{G} = [H]\underline{s} + \underline{\varepsilon} \quad (3)$$

The amplitudes of the scatterers can now be determined from the least squares solution of (3), i.e., by requiring that $$\|[H]\underline{s} - \underline{G}\|_m \to \min, \quad (4)$$

where $\|\bullet\|_m$ denotes m-norm and the least squares solution is obtained for m=2. If we assume that the number of antenna pairs is larger than that of scattering centers, i.e., $N_t, N_r > N$, matrix [H] is expected to be full rank.

It should be noted that if the matrix is rank deficient, we can require the solution to satisfy the following condition $$\|\underline{S}\|_m \to \min, \quad (5)$$

in addition to (4). In this case, a robust regularization scheme can be obtained by combining (4) and (5) with some appropriate weighting.

Generally, a SAR technique can produce two-dimensional images of the area of interest. An Interferometric SAR (InSAR) processing allows adding of a vertical dimension to an image obtained by the SAR technique that provides horizontal resolution.

An algorithm for an InSAR processing of a signal scattered from the tag of the present invention for obtaining a vertical resolution of the tag's elements in rows is described hereinbelow, in accordance with an embodiment of the present invention.

The vertical dimension and resolution of the elements can be obtained by using at least one transmitting antenna and two receiving antennas. It should be noted that the function of the receiving and transmitting antennas may be swapped. InSAR model assumes that each diffractive element (pixel in the image) corresponds to a single scatter with a well-defined height. Then the height of the scatterer can be computed from the phase difference between the signals received by two pairs of antennas. The phase difference is related to the optical path lengths by $$\Delta\varphi = 2\pi/\lambda(\rho_2 - \rho_1), \quad (6)$$

where $\rho_1$ and $\rho_2$ denote the path length of the signal to one pair of vertically arranged antennas and $\lambda$ is the wavelength. The path lengths are related to the height of the scatterer by simple relations dependent on the geometrical details of the data collection system. Since the phase can be ambiguous (modulo $2\pi$) a phase unwrapping technique, known per se, can be used in order to obtain correct results.

The present invention employs the InSAR principles in order to read information encoded in the tag by using "vertical" position coding. As described above with reference to FIG. 1A, the tag comprises an array of diffractive elements (some of which may be absent) indicative of information symbols. The diffractive elements can be conducting elements, which are formed on a package, substrate or directly on an object. When the object is conductive, the tag can comprise a plurality of holes or other absorbing elements. The tag elements are located and have dimensions to provide position and amplitude information, whereby this information represents the encoded information on the RFID tag.

Figure 3:
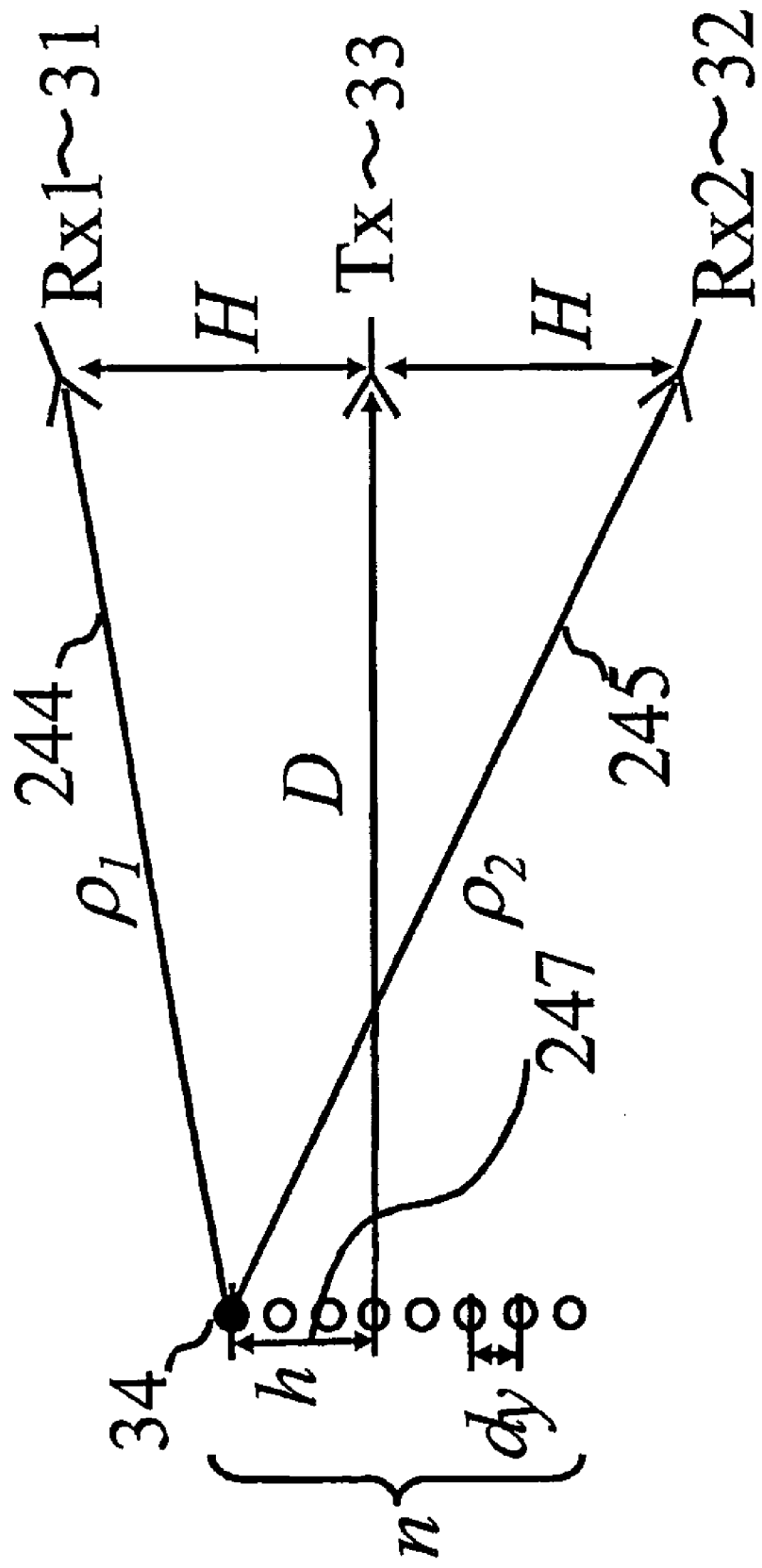
FIG. 3 shows an example of InSAR processing scheme for the tag shown in FIGS. 1A, 1B, 1C and 1D.

Referring to FIG. 3, an exemplary arrangement of a transmitting (Tx) antenna 33 and vertical pair (Rx1 and Rx2) of receiving antennas 31 and 32 for reading a diffracting element 34 of a tag (not shown) is illustrated. The transmitting (Tx) antenna 33 illuminates the tag, whereas the vertical pair (Rx1 and Rx2) of receiving antennas 31 and 32 receive the scattered radiation. It should be noted that although the tag includes a set of diffractive elements, only one such element (element 34) is shown, for the simplicity of the description. The pair of vertical antennas 31 and 32 is arranged with essentially different positions such that the paths to (or from)

the diffractive element 34 to (or from) the receiving antennas 31 and 32 will depend on the vertical position h of the element 34.

The receiving (Rx1 and Rx2) antennas 31 and 32 receive the scattered field. In this arrangement, the path lengths $\rho_1$ and $\pi_2$ from the diffracting element 34 to the receiving antennas 31 and 32 are given by $$\rho_{1,2} = \sqrt{D^2 + (H \mp h)^2} \approx \sqrt{D^2 + H^2} \mp \frac{H}{\sqrt{D^2 + H^2}} h \quad (7)$$

The approximate formula (7) can be inverted to compute the vertical position of the symbol based on the measured phase difference. This will result in $$h \approx \frac{\sqrt{D^2 + H^2}}{2H} \lambda \Delta \phi / 2\pi \quad (8)$$

If two SAR images are computed using these two receiving antennas, the phase difference can be computed for each element (pixel) in a complex SAR image and, therefore, the height h of each element can be inferred by using formula (8). It should be noted that although one transmitting antenna 33 and one vertical pair (Rx1 and Rx2) of receiving antennas 31 and 32 are shown in FIG. 3, when desired more than one transmitting antennas and more than one pair of receiving antennas can be employed. In particular, more than two pairs of antennas 31 and 32 can be used in order to resolve the phase ambiguity problem while achieving a high accuracy. Note that increasing the distance between the antennas improves the accuracy, but exacerbates the phase ambiguity problem. Thus more than two antennas can provide significant advantages as stated above, while also helping to mitigate the effects of clutter (scattering from unwanted objects surrounding the tag).

With a specific goal of reconstructing information encoded in a tag, the scatterer locations can be defined by a specific pattern. In particular, the vector of scatterer locations to be assumed to be arranged as centers of the elements. For N bit tag in the xy-plane, this means that $\{r_n\}_{n=1}^N$ are given by $$r_n = r_0 + (n - N/2) d\hat{x}, \quad (9)$$

where d is a horizontal pitch (109 in FIG. 1A) between the neighboring elements.

In such a case, the super-resolution SAR processing carried out for the signals received by the antennas 31 and 32 provides upper set of complex amplitudes $S_n^{upper}$ and lower set of complex amplitudes $s_n^{lower}$, respectively, which both contain information about horizontal locations of the diffractive elements in columns. In order to obtain vertical resolution, equation (3) can be used, in which the phase difference $\Delta\phi_n$ for the n-th element can be obtained by $$\Delta\phi_n = \arg\left(\frac{s_n^{upper}}{s_n^{lower}}\right). \quad (10)$$

Figure 4:
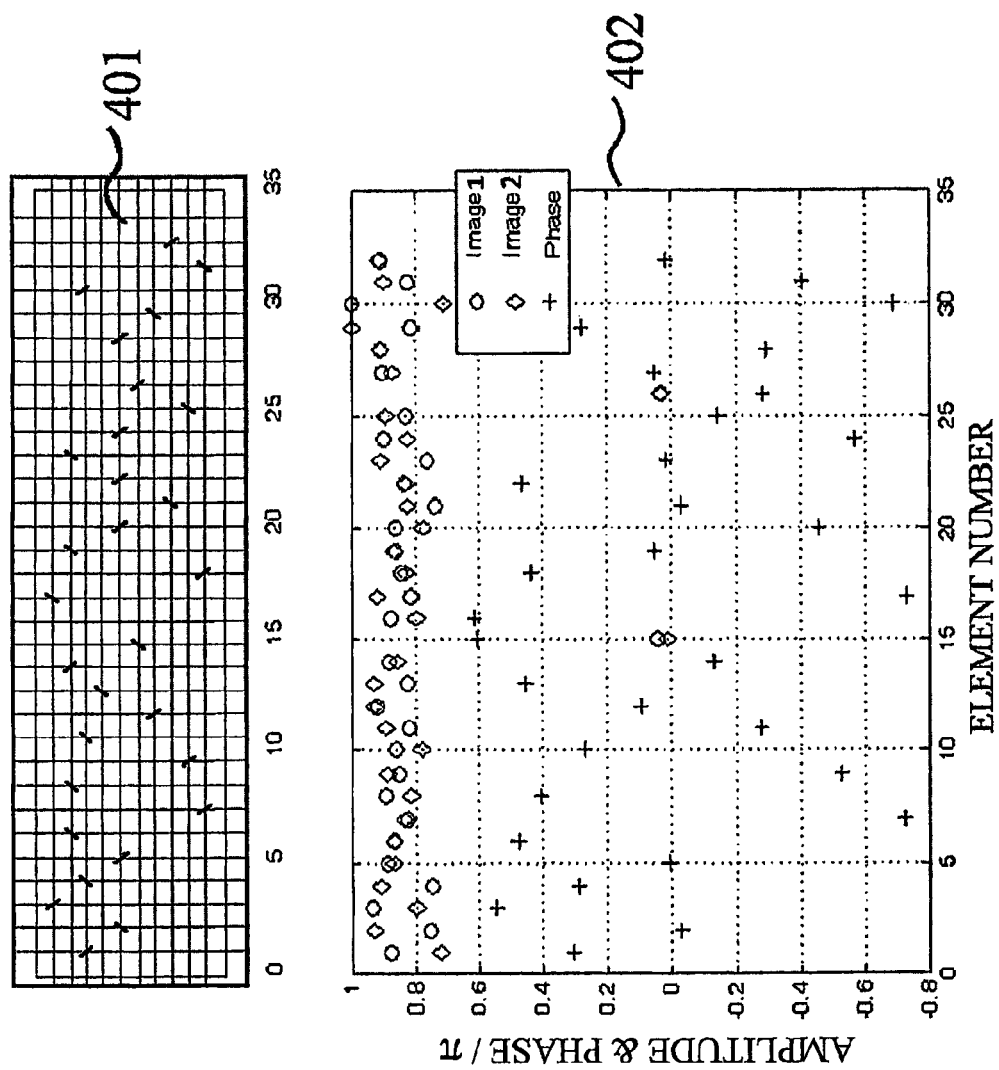
FIG. 4 shows an example of an initially processed image of an exemplary tag of the present invention.

Referring to FIG. 4, an example of an initially processed image of a tag 401 is illustrated. In this example, a super-resolution SAR processing was employed for obtaining the horizontal resolution of the tag's elements in columns, and an InSAR processing was employed for obtaining the vertical resolution of the tag's elements in rows. A plot 402 illustrates two InSAR images and the phase difference for these images calculated for each element. Specifically, Image 1 of the elements is indicated by "circular" symbols, Image 2 is indicated "diamond" symbols, whereas, the phase difference between Image 1 and Image 2 is indicated by "plus" symbols.

Image 1 has been obtained with the pair Antennas Rx1.1 and Rx3.1 shown in FIG. 2B, while Image 2 has been obtained with the pair Antennas Rx2.3 and Rx4.3. As shown in FIG. 4, the magnitudes of the phase differences between the two InSAR images represent the vertical position of each tag's element.

Figure 6:
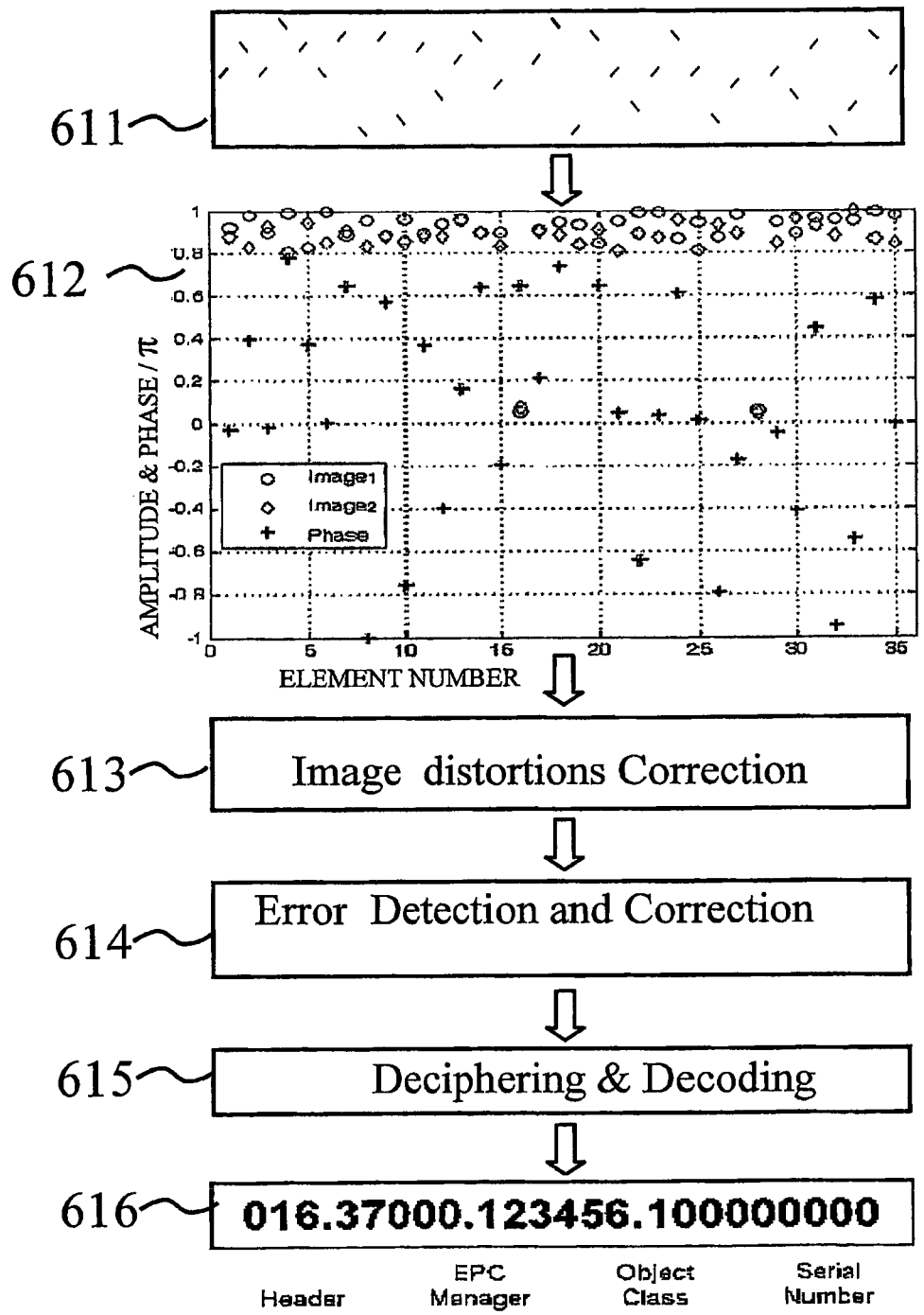
FIG. 6 shows a process for reading and reconstruction of data carried by a tag, according to one embodiment of the present invention.

Referring to FIG. 6, a process for reading and reconstruction of data carried by a tag is shown, according to one embodiment of the present invention. In the first step, the tag 611 is scanned by the identification system of the present invention. Further, re-radiated RF radiation produced by the tag is collected and processed for reading the data carried tag. Specifically the tag is processed by a SAR algorithm for determining the arrangement of symbol elements in columns and by an InSAR algorithm for determining the arrangement of the symbol elements in rows. As a result of this processing an initial image reconstruction 612 of the tag 611 is obtained.

It should be understood that the pattern of symbol elements obtained by the initial image reconstruction method may sometimes differ from the real pattern of symbols in the tag. This can happen due to the fact that the image of the tag provided at the step of image reconstruction may include also different artifacts, such as higher order diffraction pattern components. Moreover, the image of the elements can be distorted by inter-symbol interference or symbols coupling. Moreover, it should also be taken into account that in some cases the tag might be turned upside down (or inverted face side down).

In order to check the authenticity of the pattern obtained after the initial image reconstruction method, the method of reading a tag by the identification system of the present invention can further include the step of recognizing the tag's position, and accordingly correcting distortions of the tag's pattern (block 613), for example, if the tag is turned or inverted. The image distortions might also be caused by different shifts and unparallel placement of the tag and the identification system. Likewise, the method of reading a tag can also include checking possible data errors and correcting the errors in the data obtained after the image processing (block 614). As described above, in order to implement the distortion and error corrections (blocks 613 and 614), the tag should include not only the data symbol elements, but also reference elements (fiducial marks) placed for example, in peripheral regions of the tag or additional information symbols (e.g., the elements 111 in FIG. 1C) which can be included as a part of the data symbol elements for introducing redundant information, such as parity bits, checksum, etc.

In the next step (block 615), deciphering and decoding the ciphered and coded data is performed for presentation of the tag's data in the original format (block 616). According to an embodiment of the present invention, the decoding of the data includes descrambling and recovering the data stored in the tag that might be encoded in a numeric or alphanumeric format. The decoding of the tag is based on the predetermined symbol's code (language) used for encoding the data by symbol elements.

When desired, the method of reading a tag can include the step of displaying the image of the tag's elements and/or the corresponding information data on a monitor of a computer.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims and their equivalents.

What is claimed is:

1. A radio frequency identification (RFID) data tag comprising a plurality of diffractive elements diffract an interrogation radio frequency signal such that the resulting response signal signature is indicative of machine-readable data of the RFID tag, wherein said diffractive elements have such shape that the dimension of said diffractive elements along one axis being substantially different than the dimension of the elements along the perpendicular axis to reduce background clutter; wherein said diffractive elements are arranged in columns and rows in accordance with a predetermined layout scheme; and wherein in each column, the diffractive element is oriented in a direction other than the direction of the elements in the neighboring columns; wherein difference in orientation reduces coupling between neighboring elements in the tag such that electric current flowing in one element of one column does not include a current in the neighboring elements.

2. The RFID data tag of claim 1, wherein the data information code of the tag is defined by the presence or absence of the diffractive elements in columns and by the numerical number of the row corresponding to the elements.

3. The RFID data tag of claim 1, wherein the data information code of the tag is defined by the type of the diffractive element.

4. The RFID data tag of claim 3, wherein the diffractive elements include at least one strip.

5. The RFID data tag of claim 3, wherein the diffractive elements are selected from single strip elements and double strip elements.

6. The RFID data tag of claim 2, wherein the absence of a diffractive element in the column represents a zero while the presence of the diffractive element represents a certain value related to the numerical number of the row corresponding to the element.

7. The RFID data tag of claim 1, wherein the directions of each two diffractive elements in neighboring columns are perpendicular to each other.

8. The RFID data tag of claim 1, wherein at least a part of said plurality of diffractive elements introduces redundant information in a content of the tag for data error correction.

9. The RFID data tag of claim 8, wherein said redundant information is based on at least one error correction scheme selected from parity bits and checksum.

10. The RFID data tag of claim 1, wherein at least a part of said plurality of diffractive elements represents fiducial marks positioned on the tag in predefined places.

11. The RFID data tag of claim 1, wherein said diffractive elements are deposited on a substrate layer.

12. The RFID data tag of claim 1, wherein said diffractive symbol elements are incorporated into the structure of an article with which the tag is associated.

13. The RFID data tag of claim 1, wherein said diffractive elements are made of a material capable of absorbing, scattering or reflecting RF radiation.

14. A system for reading an RFID data tag comprising a plurality of diffractive elements diffract an interrogation radio frequency signal such that the resulting response signal signature is indicative of machine-readable data of the RFID tag, wherein said diffractive elements have such shape that the dimension of said diffractive elements along one axis being substantially different than the dimension of the elements along the perpendicular axis to reduce background clutter; wherein said diffractive elements are arranged in columns and rows in accordance with a predetermined layout scheme; and wherein in each column, the diffractive element is oriented in a direction other than the direction of the elements in the neighboring columns; wherein difference in orientation reduces coupling between neighboring elements in the tag such that electric current flowing in one element of one column does not include a current in the neighboring elements; the system comprising: an array of transmitting (Tx) antennas configured for emitting an RF transmitted radiation signal at a predetermined polarization towards the tag; an array of receiving (Rx) antennas configured for collecting re-radiated RF radiation produced by the tag in response to said RF transmitted radiation signal at a polarization orthogonal to the polarization of the transmitting antenna, and creating RF received signal having amplitude and phase information indicative of the data carried by the tag; and an interrogator unit configured for generating the RF transmitted signal emitted towards the tag, and processing said RF received signal for reading the data carried tag by using the amplitude information of SAR images based on the received signal for determining the arrangement of symbol elements in columns and phase information of the SAR images for determining the arrangement of the symbol elements in rows.

15. The system of claim 14, wherein said array of transmitting (Tx) antennas and said array of receiving (Rx) antennas are switching antenna arrays.

16. The system of claim 15, wherein said switching antenna arrays are based on "non-symmetric" Tx/Rx antenna arrangements.

17. The system of claim 14, wherein said interrogator unit includes:
- an RF Front-End unit coupled to said array of transmitting (Tx) antennas and said array of receiving (Rx) antennas, and including an output amplifier, an input amplifier, a control logic unit, and RF switches;
- an RF module coupled to the RF Front-End unit and configured for generating the transmitted signal, obtaining the received signals scattered from the tag;
- a control unit and a digital signal processor module coupled to the RF Front-End unit and to the RF module, and configured for controlling the operation of the RF Front-End unit and the RF module and processing SAR images based on the received signals by using their amplitude and phase information; and
- a power supply unit for providing required voltages to the system.

18. A method for reading an RFID data tag comprising a plurality of diffractive elements diffract an interrogation radio frequency signal such that the resulting response signal signature is indicative of machine-readable data of the RFID tag, wherein said diffractive elements have such shape that the dimension of said diffractive elements along one axis being substantially different than the dimension of the elements along the perpendicular axis to reduce background clutter; wherein said diffractive elements are arranged in columns and rows in accordance with a predetermined layout scheme; and wherein in each column, the diffractive element is oriented in a direction other than the direction of the elements in the neighboring columns; wherein difference in orientation reduces coupling between neighboring elements in the tag such that electric current flowing in one element of one column does not include a current in the neighboring elements, the method comprising: generating and radiating an RF transmitted signal at a predetermined polarization towards the RFID data tag; collecting re-radiated RF signal scattered by the tag in response to said RF radiation signal at a polarization orthogonal to the polarization of said RF transmitted signal, and creating RF received signal having amplitude and phase information indicative of the data carried by the tag; and processing said RF received signal for reading the data carried tag by using the amplitude information of SAR images based on the received signal for determining the arrangement of symbol elements in columns and the phase information of the SAR images for determining the arrangement of the symbol elements in rows.

19. The method of claim 18, wherein the determining of the arrangement of diffractive elements in columns includes a SAR processing.

20. The method of claim 19, wherein said SAR processing utilizes a regular SAR processing or a super-resolution SAR processing.

21. The method of claim 18, wherein the determining of the arrangement of diffractive elements in rows includes an Interferometric SAR (InSAR) processing.

22. The method of claim 18, wherein said processing of the RF received signal includes:
    reconstructing an initial image of the tag;
    correcting distortions of the tag's pattern in the initial image;
    detecting and correcting errors in the initial image; and
    deciphering and decoding the data carried by the tag.

* * * * *